US006610801B1

(12) United States Patent
Scherer

(10) Patent No.: US 6,610,801 B1
(45) Date of Patent: Aug. 26, 2003

(54) PROCESSES FOR SYNTHESIS OF POLYMER COMPOSITIONS

(75) Inventor: Markus Scherer, Lebach (DE)

(73) Assignee: RohMax Additives GmbH, Darmstadt (DE)

( * ) Notice: Subject to any disclaimer, the term of this patent is extended or adjusted under 35 U.S.C. 154(b) by 77 days.

(21) Appl. No.: 09/709,531

(22) Filed: Nov. 13, 2000

(51) Int. Cl.$^7$ .................................................. C08F 4/06
(52) U.S. Cl. ..................... 526/135; 526/145; 526/146; 526/147; 526/319; 526/318.4; 526/328
(58) Field of Search ................................ 526/135, 145, 526/146, 147, 319, 328, 318.4

(56) References Cited

U.S. PATENT DOCUMENTS 5,807,937 A * 9/1998 Matyjaszewski et al. ... 526/135

FOREIGN PATENT DOCUMENTS

| WO | WO 96/30421 | | 10/1996 | |
| WO | WO 97/47661 | | 12/1997 | |
| WO | WO 98/40415 | * | 9/1998 | ............. C08F/4/10 |

* cited by examiner

*Primary Examiner*—Tatyana Zalukaeva

(74) *Attorney, Agent, or Firm*—Oblon, Spivak, McClelland, Maier & Neustadt, P.C.

(57) ABSTRACT

The present invention relates to processes for synthesis of poly(meth)acrylate compositions, wherein ethylenically unsaturated monomers are transformed to polymers by means of initiators containing a transferable group of atoms and of one or more catalysts comprising at least one transition metal in the presence of ligands which can form a coordination compound with the metal catalyst or catalysts, wherein ethylenically unsaturated monomers containing 50 to 100 wt %, relative to the total weight of ethylenically unsaturated monomers, of (meth)acrylates of formula (I) are polymerized

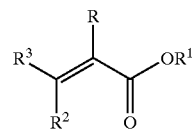

wherein R denotes hydrogen or methyl, $R^1$ denotes a straight-chain or branched alkyl group with 8 to 40, carbon atoms, $R^2$ and $R^3$ independently denote hydrogen or a group of the formula —COOR$^1$, wherein R' denotes hydrogen or a straight-chain or branched alkyl group with 8 to 40, carbon atoms, in the presence of copper, the total concentration of copper of oxidation numbers (I) and (II) in the polymerization composition being $\leq 200$ ppm relative to the total weight of the composition.

24 Claims, No Drawings

PROCESSES FOR SYNTHESIS OF POLYMER COMPOSITIONS

The invention relates to processes for synthesis of polymer compositions, wherein ethylenically unsaturated monomers are polymerized by means of initiators containing a transferable group of atoms and of one or more catalysts comprising at least one transition metal in the presence of ligands which can form a coordination compound with the metal catalyst or catalysts. The invention also relates to the use of these polymer compositions as well as to processes for isolation of polymers from such a polymer solution.

Radical polymerization is an important commercial process for synthesis of diverse polymers, such as PMMA and polystyrene. It suffers from the disadvantage that it is relatively difficult to control the composition of the polymers, the molecular weight and the molecular weight distribution.

One solution to this problem is offered by the so-called ATRP process (=Atom Transfer Radical Polymerization). It is assumed that this process comprises "living" radical polymerization, although the description of the mechanism is not to be construed as limitative. In this process a transition metal compound is reacted with a compound containing a transferable group of atoms. Under these conditions the transferable group of atoms is transferred to the transition metal compound, whereby the metal is oxidized. A radical that adds onto ethylenic groups is formed in this reaction. The transfer of the group of atoms to the transition metal compound is reversible, however, and so the group of atoms is transferred back to the growing polymer chain, whereby a controlled polymerization system is formed. Accordingly it is possible to control the composition of the polymer, the molecular weight and the molecular weight distribution.

This reaction procedure is described, for example, by J-S. Wang et al., J. Am. Chem. Soc., Vol. 117, pp. 5614–5615, and by Matyjaszewski, Macromolecules, Vol. 28, pp. 7901–7910 (1995). Furthermore, International Patent Applications WO 96/30421, WO 97/47661, WO 97/18247, WO 98/20050, WO 98/40415 and WO 99/10387 disclose modifications of the aforesaid ATRP.

The mechanism described hereinabove is not undisputed. WO 97/47661, for example, states that polymerization takes place by insertion, and not by a radical mechanism. Such a differentiation is not pertinent to the present invention, however, since in the reaction procedure disclosed in WO 97/47661 there are used compounds which are also employed for ATRP.

The monomers, transition metal catalysts, ligands and initiators are chosen on the basis of the polymer solution desired. It is assumed that a high rate constant of the reaction between the transition metal/ligand complex and the transferable group of atoms, plus a low equilibrium concentration of free radicals, is essential for a narrow molecular weight distribution. If the free radical concentration is too high, typical termination reactions, which are responsible for a broad molecular weight distribution, will occur. The exchange rate depends, for example, on the transferable group of atoms, on the transition metal, on the ligands and on the anion of the transition metal compound. The person skilled in the art will find valuable advice on selection of these compounds in, for example, International Patent WO 98/40415.

The advantages of known ATRP processes, however, are largely limited to monomers which are themselves polar or which are readily soluble in polar media. Certainly the occasional use of nonpolar aprotic hydrocarbons such as benzene, toluene, xylene, cyclohexane and hexane is also known from the literature, but the polymers synthesized with these solvents exhibit much greater polydispersity. This effect is described in, for example, WO 98/40415.

The same document also discloses the possibility of polymerizing polar monomers such as methyl methacrylate or styrene by means of metallic copper, but the molecular weight distribution is much more unfavorable than in the use of a mixture of $Cu^0/CuBr$ or $Cu^0/CuBr_2$.

In Pol. Preprint (ACS, Div. Pol. Chem)., 1999, 40(2), 432, M. J. Ziegler et al. state among other facts that the polymerization of t-butyl methacrylate is difficult to control if the said process takes place in bulk. Both the molecular weight and the polydispersity can be improved by using approximately 20 to 25 wt % of polar solvents. Of course, because of the limited solubility in polar solvents of ethylenically unsaturated ester compounds containing alkyl or heteroalkyl groups with at least 8 carbon atoms, it is difficult by means of the known ATRP processes to polymerize ethylenically unsaturated monomer mixtures that contain at least 50 wt % of ethylenically unsaturated ester compounds containing alkyl or heteroalkyl chains with at least 8 carbon atoms. Furthermore, depending on use, these large volumes of polar solvents must be separated from the composition after synthesis of the polymers.

In view of the prior art, it is now an object of the present invention to provide processes for synthesis of a polymer composition, wherein the polymers contained in the composition are intended to comprise at least 50 wt % of (meth)acrylates containing alkyl or heteroalkyl chains with at least 8 carbon atoms.

Furthermore, the polymers contained in the composition are intended to have a narrow molecular weight distribution. In particular, it is intended that the use of relatively complex processes such as anionic polymerization for synthesis of the polymer mixture will be avoided.

Another object of the present invention was to provide a polymerization process by which polymers with relatively high or high molecular weights can be obtained.

Yet another object was to provide a process that can be performed inexpensively and applied on a large industrial scale. Furthermore, the process should be possible easily and simply with commercially available components.

These objects are achieved by a process for synthesis of a polymer composition having all features of claim 1, as are other objects which are not explicitly cited but which can be obviously derived or inferred from the relationships discussed herein in the introduction. Advantageous modifications of the inventive process are protected in the dependent claims which refer back to claim 1. As regards the process for synthesis of polymers, the independent process claim specifies how to achieve the underlying object, while the claim in the use category protects a preferred use of a polymer solution synthesized according to the present process.

By polymerizing ethylenically unsaturated monomers containing 50 to 100 wt %, relative to the total weight of ethylenically unsaturated monomers, of one or more ethylenically unsaturated ester compounds of formula (I)

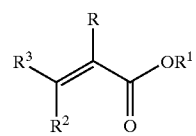

wherein R denotes hydrogen or methyl, $R^1$ denotes a straight-chain or branched alkyl group with 8 to 40, preferably 10 to 40 carbon atoms, $R^2$ and $R^3$ independently denote hydrogen or a group of the formula —COOR', wherein R' denotes hydrogen or a straight-chain or branched alkyl group with 8 to 40, preferably 10 to 40 carbon atoms, in the presence of copper, the concentration of copper of oxidation numbers (I) and (II) in the composition being ≦200 ppm relative to the total weight of the composition, less the weight of copper of oxidation number (0) in the composition, it has become possible in a manner that is not directly foreseeable to achieve a process for synthesis of a polymer composition having a narrow distribution of the polymers.

For this purpose ethylenically unsaturated monomers are polymerized by means of initiators containing a transferable group of atoms and of one or more catalysts comprising at least one transition metal in the presence of ligands which can form a coordination compound with the metal catalyst or catalysts. This type of synthesis can be achieved particularly inexpensively and in this respect is industrially interesting.

At the same time, several other advantages can be achieved by the inventive process. They include among others:

A narrow distribution of the polymers in the polymer compositions synthesized by the process.

The inventive process permits excellent control of the molecular weight of the polymers contained in the compositions.

The polymerization can be performed with relatively few problems as regards pressure, temperature and solvent, acceptable results being obtained under certain circumstances even at moderate temperatures.

High yields can be achieved by means of the inventive process.

The inventive process has very few side reactions.

The process can be performed inexpensively. In this respect it should be kept in mind that only very low concentrations of catalysts are used.

Furthermore, if metallic copper is used as the copper source, it can be removed from the reaction mixture without problems, and this catalyst can be reused in further reactions without purification.

Polymers with a predetermined composition and tailor-made structure can be synthesized by means of the process of the present invention.

The polymer compositions obtained in this way can be used for many purposes without the need to separate the copper catalyst present in solution.

By means of the inventive process it is possible to copolymerize monomers with unsaturated ester compounds that themselves can function as ligands. A particularly surprising discovery is that a narrow molecular weight distribution is obtained under these conditions.

In the inventive process, polymerization takes place in the presence of copper. In this connection, what is important for the invention within the meaning of the invention is that concentration of copper which, during the polymerization, is present in the polymerization composition as oxidized copper of oxidation numbers (I) and (II), preferably oxidation number (+1). Whether copper of oxidation number (+2) can actually also be present and, if so, whether it is relevant for the progress of polymerization, is of no importance for the invention itself. By virtue of the determination methods employed, however, the concentration of copper of oxidation number (+2) is included together with copper of oxidation number (+1) in the balance. The concentration of copper of oxidation number (0) in the polymerization composition can be well above the value of 200 ppm, there being no upper limit as long as the concentration of copper of oxidation numbers (I) and (II) is sufficiently low. As regards the terminology of the invention, the terms "copper of oxidation number (I)" and "copper of oxidation number (II)" are to be understood as synonymous with "copper of oxidation number (+1)" and "copper of oxidation number (+2)" respectively.

In combination with the monomers used in the invention, even very low concentrations of copper of oxidation numbers (I) and (II) lead surprisingly to polymers with relatively narrow distribution. In this case the concentration of oxidized copper of numbers (I) and (II) in the composition can be up to 200 ppm, preferably up to 150 ppm and especially preferably up to 100 ppm relative to the weight of the total composition. The concentration of copper in ppm is expressed as the sum of the weights of Cu(I) and Cu(II) relative to the weight of the total composition, less the weight of copper of oxidation number (0) in the composition. Depending on each special polymerization composition, the minimum concentration of oxidized copper needed for catalysis of ATRP can vary over a well defined range. In general, at least 5 to 10 ppm is advantageous. Concentrations of more than 10 ppm, expediently 20 and more ppm are preferred. A very expedient range comprises 10 to 200 ppm, preferably 20 to 200 ppm and very preferably 50 to 200 ppm. For most applications, the range from 50 to 100 ppm can be regarded as optimal.

The oxidized copper of interest for ATRP of certain monomers of the invention esterified with relatively long-chain groups (copper of oxidation numbers +1 and +2) can be generated from various sources.

In a first and especially preferred version of the process, the inventive process is characterized in that metallic copper is used as the source of copper of oxidation numbers (I) and (II) in the polymerization composition.

Metallic copper can be added to the reaction mixture in any desired form. Preferred copper sources include among others copper sheet, copper wire, copper foil, copper shavings, copper gauze, copper braid, copper textile and or copper powder as well as copper dust, among others. In this connection, sources that can be readily separated once again from the polymer composition, such as copper sheet, copper wire, copper foil and copper braid are preferred over sources that are less easy to separate, such as copper powder or copper dust.

Yet another special modification of the inventive process is based on the use in the polymerization composition of a copper salt as the source of copper of oxidation numbers (I) and (II). The use of a transition metal salt of copper in the low concentrations that are characteristic according to the invention includes all compounds of the transition metal copper that can participate in a redox cycle with the initiator that is also to be used, or with the polymer chain, which contains a transferable group of atoms. In these cycles the transferable group of atoms and the catalyst reversibly form a compound, wherein the oxidation number of the transition metal is raised or lowered. It is assumed that radicals are liberated and trapped in this process, and so the radical concentration remains very low. It is also possible, however, that the insertion of ethylenically unsaturated monomers into the Y—X or Y(M)$_z$—X bond is made possible or facilitated by the addition of the transition metal compound to the transferable group of atoms, where Y and X have the meanings to be explained hereinafter, M denotes the monomers and z indicates the degree of polymerization.

Within the meaning of the invention, a copper salt or a mixture of copper salts can be used as the copper source and thus as the catalyst. It is assumed that the redox cycles of the polymerization are catalyzed during the polymerization, the $Cu^+/Cu^{2+}$ redox couple, for example, being active. Accordingly, the metal compounds usable as copper sources are added to the reaction mixture in the form of halides such as chloride or bromide, as alkoxide, hydroxide, oxide, sulfate, phosphate, or hexafluorophosphate, trifluoromethanesulfate. The preferred metal compounds include $Cu_2O$, $CuBr$, $CuCl$, $CuI$, $CuN_3$, $CuSCN$, $CuCN$, $CuNO_2$, $CuNO_3$, $CuBF_4$, $Cu(CH_3COO)$ and/or $Cu(CF_3COO)$.

Especially preferred is a process in which there is used as the copper salt a copper halide, especially expediently copper(I) chloride.

It is also possible, however, to use compounds with higher oxidation numbers, such as $CuBr_2$, $CuCl_2$ and/or $CuO$. In these cases the reaction can be initiated by means of classical radical sources, such as AIBN. In this case the transition metal compounds are reduced first of all, since they are reacted with the radicals generated from the classical radical sources. Such a process is reverse ATRP, as described by Wang and Matyjaszewski in Macromolecules (1995), Vol. 28, pp. 7572–7573.

Furthermore, the transition metals can be used for catalysis in the form of metals of oxidation number zero, especially in a mixture with the compounds mentioned hereinabove, as is described in, for example, International Patent WO 98/40415. In these cases the rate constant of the reaction can be increased. It is assumed that hereby the concentration of catalytically active transition metal compound is increased by using equal proportions of transition metals having high oxidation numbers and of metallic transition metal. Nevertheless, within the scope of the invention, an abnormally low total concentration of copper (I) and (II) is ensured at all times.

For determination of the quantity (concentration) of copper of oxidation numbers (I) and (II) relevant according to the present invention, the following methods can be adopted, for example, depending on the nature of the copper source.

If metallic copper is chosen as the copper source, the metallic copper source can be removed from the composition after the end of polymerization, for example by extraction from the batch or by filtration. The copper concentration in the remaining polymer composition can be determined by techniques such as atomic absorption spectroscopy (AAS) or atomic emission spectroscopy (AES), if necessary after digestion procedures known in themselves have been performed. In this way the quantity and thus the concentration of copper (I)+copper (II) liberated from the copper source (oxidized) in the course of polymerization is determined.

If a copper compound (copper salt) is chosen as the source, it is sufficient to determine the initial weight and from this to derive the maximum quantity of copper of the relevant oxidation numbers (+1) and (+2) present in the system.

According to the process of the present invention there are polymerized ethylenically unsaturated monomers containing 50 to 100 wt %, preferably 60 to 100 wt % relative to the total weight of ethylenically unsaturated monomers, of one or more ethylenically unsaturated ester compounds of formula (I)

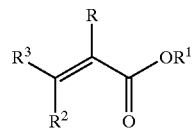

wherein R denotes hydrogen or methyl, $R^1$ denotes a straight-chain or branched alkyl group with 8 to 40, preferably 10 to 40 carbon atoms, especially expediently 10 to 24 carbon atoms, $R^2$ and $R^3$ independently denote hydrogen or a group of the formula —COOR', wherein R' denotes hydrogen or a straight-chain or branched alkyl group with 8 to 40, preferably 10 to 40 carbon atoms. The said alkyl group can be straight-chain, cyclic or branched.

Such compounds according to formula (I) include (meth)acrylates, maleates and fumarates, each of which contains at least one alcohol group with 8 to 40, preferably 10 to 40 carbon atoms.

For this purpose there are preferred (meth)acrylates of formula (II)

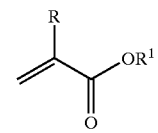

wherein

R denotes hydrogen or methyl and $R^1$ denotes a straight-chain or branched alkyl group with 8 to 40, preferably 10 to 40 carbon atoms.

The expression (meth)acrylates includes methacrylates and acrylates as well as mixtures of the two. These monomers are known. They include among others (meth)acrylates derived from saturated alcohols, such as 2-ethylhexyl(meth)acrylate, octyl(meth)acrylate, nonyl(meth)acrylate, isooctyl (meth)acrylate, isononyl(meth)acrylate, 2-tert-butylheptyl (meth)acrylate, 3-isopropylheptyl(meth)acrylate, decyl (meth)acrylate, undecyl(meth)acrylate, 5-methylundecyl (meth)acrylate, dodecyl(meth)acrylate, 2-methyldodecyl (meth)acrylate, tridecyl(meth)acrylate, 5-methyltridecyl (meth)acrylate, tetradecyl(meth)acrylate, pentadecyl(meth) acrylate, hexadecyl(meth)acrylate, 2-methylhexadecyl (meth)acrylate, heptadecyl(meth)acrylate, 5-isopropylheptadecyl(meth)acrylate, 4-tert-butyloctadecyl (meth)acrylate, 5-ethyloctadecyl(meth)acrylate, 3-isopropyloctadecyl(meth)acrylate, octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth) acrylate; (meth)acrylates derived from unsaturated alcohols, such as oleyl(meth)acrylate; cycloalkyl(meth)acrylates, such as 3-vinyl-2-butylcyclohexyl(meth)acrylate and bornyl (meth)acrylate.

The ester compounds with long-chain alcohol groups can be obtained, for example, by reaction of (meth)acrylates, fumarates, maleates and/or the corresponding acids with long-chain fatty alcohols, in which reaction a mixture of esters such as (meth)acrylates with alcohol groups of various chain lengths is generally obtained. These fatty alcohols include among others Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea; Epal® 610 and Epal® 810 of Ethyl Corporation; Linevol® 79, Linevol® 911 and Dobanol® 25 L of Shell AG; Lial® 125 of Condea Augusta, Milan; Dehydad® and Lorol® of Henkel KGaA as well as Linopol 7-11 and Acropol® 91 of Ugine Kuhlmann.

In addition to the ethylenically unsaturated ester compounds designated as component a), which are derived from alcohols with 8 to 40 carbon atoms, the monomer mixture can also contain further ethylenically unsaturated monomers that can be copolymerized with the aforesaid ester compounds. These monomers include among others b) 0 to 40 wt %, especially 0.5 to 20 wt % of one or more (meth)acrylates of formula (III)

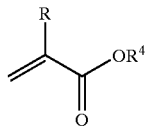

wherein R denotes hydrogen or methyl and $R^4$ denotes a straight-chain or branched alkyl group with 1 to 7 carbon atoms, c) 0 to 40 wt %, especially 0.5 to 20 wt % of one or more (meth)acrylates of formula (IV)

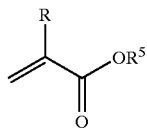

wherein R denotes hydrogen or methyl and $R^5$ denotes an alkyl group, substituted with an OH group, with 2 to 20, especially 2 to 6 carbon atoms, or an ethoxylated group of formula (V)

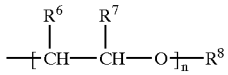

wherein $R^6$ and $R^7$ independently stand for hydrogen or methyl, $R^8$ stands for hydrogen or an alkyl group with 1 to 40 carbon atoms, and n stands for an integral number from 1 to 60, d) 0 to 40 wt %, especially 0.5 to 20 wt % of one or more (meth)acrylates of formula (VI)

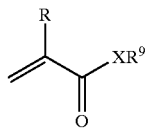

wherein R denotes hydrogen or methyl, X denotes oxygen or an amino group of formula —NH— or —$NR^{10}$—, wherein $R^{10}$ stands for an alkyl group with 1 to 40 carbon atoms, and $R^9$ denotes a straight-chain or branched alkyl group, substituted by at least one —$NR^{11}R^{12}$ group, with 2 to 20, preferably 2 to 6 carbon atoms, wherein $R^{11}$ and $R^{12}$ independently of one another stand for hydrogen, an alkyl group with 1 to 20, preferably 1 to 6, or wherein $R^{11}$ and $R^{12}$, including the nitrogen atom and possibly a further nitrogen or oxygen atom, form a 5-membered or 6-membered ring, which may or may not be substituted with $C_1$ to $C_6$ alkyl, and e) 0 to 40 wt %, especially 0.5 to 20 wt % of one or more comonomers, wherein the wt % value in each case refers to the total weight of ethylenically unsaturated monomers.

Examples of component b) include among others (meth)acrylates derived from saturated alcohols, such as methyl (meth)acrylate, ethyl(meth)acrylate, n-propyl(meth)acrylate, isopropyl(meth)acrylate, n-butyl(meth)acrylate, tert-butyl(meth)acrylate, pentyl(meth)acrylate, hexyl(meth)acrylate and heptyl(meth)acrylate; cycloalkyl(meth)acrylates such as cyclopentyl(meth)acrylate and cyclohexyl (meth)acrylate; (meth)acrylates derived from unsaturated alcohols, such as 2-propynyl(meth)acrylate, allyl(meth)acrylate and vinyl(meth)acrylate.

(Meth)acrylates according to formula (IV) are known to those skilled in the art. They include among others hydroxyalkyl(meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol methacrylate, 1,10-decanediol methacrylate, 1,2-propanediol methacrylate; polyoxyethylene and polyoxypropylene derivatives of (meth)acrylic acid, such as triethylene glycol(meth)acrylate, tetraethylene glycol(meth)acrylate and tetrapropylene glycol(meth)acrylate.

The (meth)acrylates or (meth)acrylamides according to formula (VI) (component d) include among others amides of (meth)acrylic acid, such as N-(3-dimethylaminopropyl) methacrylamide, N-(diethylphosphono)methacrylamide, 1-methacryloylamido-2-methyl-2-propanol, N-(3-dibutylaminopropyl)methacrylamide, N-t-butyl-N-(diethylphosphono)methacrylamide, N,N-bis (diethylaminoethyl)methacrylamide, 4-methacryloylamido-4-methyl-2-pentanol, N-(methoxymethyl)methacrylamide, N-(2-hydroxyethyl)methacrylamide, N-acetyl methacrylamide, N-(dimethylaminoethyl)methacrylamide, N-methyl-N-phenyl methacrylamide, N,N-diethyl methacrylamide, N-methyl methacrylamide, N-N-dimethyl methacrylamide, N-isopropyl methacrylamide; aminoalkyl methacrylates, such as tris(2-methacryloxyethyl)amine, N-methylformamidoethyl methacrylate, 2-ureidoethyl methacrylate; heterocyclic(meth)acrylates such as 2-(1-imidazolyl)ethyl(meth)acrylate, 2-(4-morpholinyl)ethyl (meth)acrylate and 1-(2-methacryloyloxyethyl)-2-pyrrolidone.

Component e) comprises in particular ethylenically unsaturated monomers that can be copolymerized with the ethylenically unsaturated ester compounds of formulas (I), (II), (III), (IV) and/or (VI).

Especially suitable as comonomers for polymerization according to the present invention, however, are compounds corresponding to the formula:

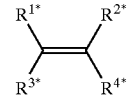

wherein $R^{1*}$ and $R^{2*}$ are selected independently from the group comprising hydrogen, halogens, CN, straight-chain or branched alkyl groups with 1 to 20, preferably 1 to 6 and especially preferably 1 to 4 carbon atoms, which may be substituted with 1 to (2n+1) halogen atoms, wherein n is the number of carbon atoms of the alkyl group (for example, $CF_3$), α,β-unsaturated straight-chain or branched alkenyl or alkynyl groups with 2 to 10, preferably 2 to 6 and especially preferably 2 to 4 carbon atoms, which may be substituted with 1 to (2n−1) halogen atoms, preferably chlorine, wherein n is the number of carbon atoms of the alkyl group, for example $CH_2$=CCl—, cycloalkyl groups with 3 to 8 carbon atoms, which may be substituted with 1 to (2n −1) halogen atoms, preferably chlorine, wherein n is the number of carbon atoms of the cycloalkyl group; C(=Y*)$R^{5*}$, C(=Y*)$NR^{6*}R^{7*}$, Y*C(=Y*)$R^{5*}$, $SOR^{5*}$, $SO_2R^{5*}$, $OSO_2R^{5*}$, $NR^{8*}SO_2R^{5*}$, $PR^{5*}_2$, P(=Y)$R^{5*}_2$, Y*P$R^{5*}_2$Y*P (=Y*)$R^{5*}_2$, $NR^{8*}_2$, which can be quaternized with an additional $R^{8*}$, aryl or heterocyclyl group, wherein Y* can be $NR^{8*}$, S or O, preferably O; $R^{5*}$ is an alkyl group with 1 to 20 carbon atoms, an alkylthio group with 1 to 20 carbon atoms, $OR^{15}$ ($R^{15}$ is hydrogen or an alkali metal), an alkoxy group with 1 to 20 carbon atoms, an aryloxy or heterocyclyloxy group; $R^{6*}$ and $R^{7*}$ independently are hydrogen or an alkyl group with 1 to 20 carbon atoms, or $R^{6*}$ and $R^{7*}$ together can form an alkylene group with 2 to 7, preferably 2 to 5 carbon atoms, wherein they form a 3-membered to 8-membered ring, preferably a 3-membered to 6-membered ring, and $R^{8*}$ is hydrogen, a straight-chain or branched alkyl group or aryl group with 1 to 20 carbon atoms; $R^{3*}$ and $R^{4*}$ are independently selected from the group comprising hydrogen, halogen (preferably fluorine or chlorine), alkyl groups with 1 to 6 carbon atoms and $COOR^{9*}$, wherein $R^{9*}$ is hydrogen, an alkali metal or an alkyl group with 1 to 40 carbon atoms, or $R^{1*}$ and $R^{3*}$ together can form a group of formula $(CH_2)_{n'}$, which may be substituted with 1 to 2n' halogen atoms or $C_1$ to $C_4$ alkyl groups, or can form the formula (C(=O)—Y*—C(=O), wherein n' is from 2 to 6, preferably 3 or 4 and Y* is as defined hereinabove; and wherein at least 2 of the groups $R^{1*}$, $R^{2*}$, $R^{3*}$ and $R^{4*}$ are hydrogen or halogen.

Component e) comprises in particular ethylenically unsaturated monomers that can be copolymerized with the ester compounds of formula (I). They include among others nitriles of (meth)acrylic acid and other nitrogen-containing methacrylates such as methacryloylamidoacetonitrile, 2-methacryloyloxyethyl methyl cyanamide, cyanomethyl methacrylate; aryl methacrylates, such as benzyl methacrylate or phenyl methacrylate, wherein each of the aryl groups can be unsubstituted or be substituted at up to four positions; carbonyl-containing methacrylates, such as 2-carboxyethyl methacrylate, carboxymethyl methacrylate, oxazolidinyl-ethyl methacrylate, N-(methacryloyloxy)formamide, acetonyl methacrylate, N-methacryloylmorpholine, N-methacryloyl-2-pyrrolidinone; glycol dimethacrylates, such as 1,4-butanediol methacrylate, 2-butoxyethyl methacrylate, 2-ethoxyethoxymethyl methacrylate, 2-ethoxyethyl methacrylate, methacrylates of ether alcohols, such as tetrahydrofurfuryl methacrylate, vinyloxyethoxy-ethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;

methacrylates of halogenated alcohols, such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate; oxiranyl methacrylates, such as 2,3-epoxybutyl methacrylate, 3,4-epoxybutyl methacrylate, glycidyl methacrylate; methacrylates containing phosphorus, boron and/or silicon, such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate; sulfur-containing methacrylates, such as ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl)sulfide; trimethacrylates, such as trimethyloylpropane trimethacrylate;

vinyl halides, such as vinyl chloride, vinyl fluoride, vinylidene chloride and vinylidene fluoride; vinyl esters, such as vinyl acetate; styrene, substituted styrenes with an alkyl substituent in the side chain, such as α-methylstyrene and α-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers; maleic acid and maleic acid derivatives, such as monoesters and diesters of maleic acid, wherein the alcohol groups have 1 to 9 carbon atoms, maleic anhydride, methylmaleic anhydride, maleimide, methylmaleimide; fumaric acid and fumaric acid derivatives, such as monoesters and diesters of fumaric acid, wherein the alcohol groups have 1 to 9 carbon atoms; dienes such as divinylbenzene.

In addition to styrene there are preferred in particular as comonomers monomers that have dispersing effects, such as the heterocyclic vinyl compounds mentioned hereinabove. These monomers will be referred to hereinafter as dispersing monomers.

The ethylenically unsaturated monomers mentioned hereinabove can be used individually or as mixtures. It is also possible to vary the monomer composition during polymerization, in order to obtain well defined structures such as block copolymers.

In preferred embodiments of the inventive process, at least 70 weight per cent of the ethylenically unsaturated monomers, especially preferably more than 80 wt % of the ethylenically unsaturated monomers, relative to the total weight of the ethylenically unsaturated monomers are (meth)acrylates, maleates and/or fumarates with alkyl or heteroalkyl chains containing at least 6 carbon atoms.

The monomers mentioned hereinabove are polymerized by means of initiators that contain a transferable group of atoms. In general, these initiators can be described by the formula Y—(X)$_m$, wherein Y denotes the central molecule, which is assumed to form radicals, X represents a transferable atom or a transferable group of atoms, and m denotes an integral number in the range of 1 to 10, depending on the functionality of group Y. If m>1, the various transferable groups X of atoms can have different meanings. If the functionality of the initiator is >2, star polymers are obtained. Preferred transferable atoms or groups of atoms are halogens, such as Cl, Br and/or I.

As mentioned hereinabove, it is assumed that group Y forms radicals that function as starter molecules, in that this radical adds onto the ethylenically unsaturated monomers. Thus group Y preferably has substituents that can stabilize the radicals. Such substituents include among others —CN, —COR and —CO$_2$R, wherein R in each case denotes an alkyl or aryl group, or aryl and/or heteroaryl groups.

Alkyl groups are saturated or unsaturated, branched or straight-chain hydrocarbon groups with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl groups are cyclic aromatic groups having 6 to 14 carbon atoms in the aromatic ring. These groups may be substituted.

Examples of substituents are straight-chain and branched alkyl groups with 1 to 6 carbon atoms, such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups as well as halides.

Examples of aromatic groups include phenyl, xylyl, toluyl, naphthyl or biphenylyl.

The expression "heteroaryl" denotes a heteroaromatic ring system, wherein at least one CH group is replaced by N or two neighboring CH groups are replaced by S, O or NH, such as a thiophene, furan, pyrrole, thiazole, oxazole, pyridine, pyrimidine and benzo[a]furan group, which may also contain the substituents mentioned hereinabove.

An initiator that is usable according to the invention can be any compound that contains one or more atoms or groups of atoms which can be transferred by a radical mechanism under the polymerization conditions.

Suitable initiators include those of the formulas:

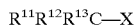

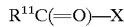

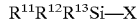

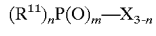

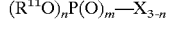

and

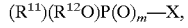

wherein X is selected from the group comprising Cl, Br, I, $OR^{10}$ [wherein $R^{10}$ denotes an alkyl group with 1 to 20 carbon atoms, wherein each hydrogen atom independently can be replaced by a halide, preferably fluoride or chloride, alkenyl with 2 to 20 carbon atoms, preferably vinyl, alkynyl with 2 to 10 carbon atoms, preferably acetylenyl, phenyl, which may be substituted with 1 to 10 halogen atoms or alkyl groups with 1 to 4 carbon atoms, or aralkyl(aryl-substituted alkyl in which the aryl group is phenyl or substituted phenyl and the alkyl group represents an alkyl with 1 to 6 carbon atoms, such as benzyl)]; $SR^{14}$, $SeR^{14}$, $OC(=O)R^{14}$, $OP(=O)R^{14}$, $OP(=O)(OR^{14})_2$, $OP(=O)OR^{14}$, $O\text{—}N(R^{14})_2$, $S\text{—}C(=S)N(R^{14})_2$, CN, NC, SCN, CNS, OCN, CNO and $N_3$, wherein $R^{14}$ denotes an aryl group or a straight-chain or branched alkyl group with 1 to 20, preferably 1 to 9 carbon atoms, wherein two $R^{14}$ groups, if present, can together form a heterocyclic ring with 5, 6 or 7 members; and $R^{11}$, $R^{12}$ and $R^{13}$ are chosen independently from the group comprising hydrogen, halogens, alkyl groups with 1 to 20, preferably 1 to 10 and especially preferably 1 to 6 carbon atoms, cycloalkyl groups with 3 to 8 carbon atoms, $R^{8*}_{3}Si$, $C(=Y^*)R^{5*}$, $C(=Y^*)NR^{6*}R^{7*}$, wherein $Y^*$, $R^{5*}$, $R^{6*}$ and $R^{7*}$ are as defined hereinabove, COCl, OH (preferably one of the groups $R^{11}$, $R^{12}$ and $R^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, wherein aryl is as defined hereinabove and alkenyl is vinyl substituted with one or two $C_1$ to $C_6$ alkyl groups and/or halogen atoms, preferably with chlorine), alkyl groups with 1 to 6 carbon atoms, in which one to all of the hydrogen atoms, preferably one, are substituted by halogen (preferably fluorine or chlorine, if one or more hydrogen atoms are replaced, and preferably fluorine, chlorine or bromine if one hydrogen atom is replaced), alkyl groups with 1 to 6 carbon atoms, which are substituted with 1 to 3 substituents (preferably 1) chosen from the group comprising $C_1$ to $C_4$ alkoxy, aryl, heterocyclyl, $C(=Y^*)R^{5*}$ (wherein $R^{5*}$ is as defined hereinabove), $C(=Y^*)NR^{6*}N^{7*}$ (wherein $R^{6*}$ and $R^{7*}$ are as defined hereinabove), oxiranyl and glycidyl(preferably not more than 2 of the groups $R^{11}$, $R^{12}$ and $R^{13}$ are hydrogen, and especially preferably at most one of the groups $R^{11}$, $R^{12}$ and $R^{13}$ is hydrogen); m=0 or 1; and m denotes 0, 1 or 2.

The particularly preferred initiators include benzyl halides, such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane; carboxylic acid derivatives which are halogenated at the α-position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides such as tetrachloromethane, tribromomethane, 1-vinylethyl chloride, 1-vinylethyl bromide; and halogen derivatives of phosphoric acid esters, such as dimethylphosphoric acid chloride.

The initiator is generally used in a concentration in the range of $10^{-4}$ mol/L to 3 mol/L, preferably in the range of $10^{-3}$ mol/L to $10^{-1}$ mol/L and especially preferably in the range of $5*10^{-2}$ mol/L to $5*10^{-1}$ mol/L, although these values are not to be construed as limitative. From the ratio of initiator to monomer there is obtained the molecular weight of the polymer, if the entire monomer is reacted. Preferably this ratio ranges between $10^{-4}$ and 1 to between 0.5 and 1, especially preferably between $1*10^{-3}$ and 1 to between $5*10^{-2}$ and 1.

The polymerization takes place in the presence of ligands that can form a coordination compound with the metallic catalyst or catalysts. Among other effects, these ligands function to increase the solubility of the transition metal compound. A further important function of the ligands is that the formation of stable organometallic compounds is prevented. This is particularly important, since these stable compounds would not polymerize under the chosen reaction conditions. It is further assumed that the ligands facilitate abstraction of the transferable group of atoms.

These ligands are known in themselves and are described in, for example, International Patents WO 97/18247 and WO 98/40415. These compounds generally contain one or more nitrogen, oxygen, phosphorus and/or sulfur atoms, via which the metal atom can be bound. Many of these ligands can be represented in general by the formula $R^{16}\text{—}Z\text{—}(R^{18}\text{—}Z)_m\text{—}R^{17}$, wherein $R^{16}$ and $R^{17}$ independently denote H, $C_1$ to $C_{20}$ alkyl, aryl, heterocyclyl, which may or may not be substituted. Such substituents include among others alkoxy groups and alkylamino groups. $R^{16}$ and $R^{17}$ may or may not form a saturated, unsaturated or heterocyclic ring. Z denotes O, S, NH, $NR^{19}$ or $PR^{19}$, wherein $R^{19}$ has the same meaning as $R^{16}$. $R^{18}$ independently denotes a divalent group with 1 to 40 C atoms, preferably 2 to 4 C atoms, which may be straight-chain, branched or cyclic, such as a methylene, ethylene, propylene or butylene group. The meaning of alkyl and aryl has been explained hereinabove. Heterocyclic groups are cyclic groups with 4 to 12 carbon atoms, in which one or more of the $CH_2$ groups of the ring is or are replaced by heteroatom-containing groups, such as O, S, NH and/or NR, wherein the group R has the same meaning as $R^{16}$.

A further group of suitable ligands can be represented by the formula

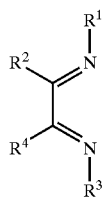

wherein $R^1$, $R^2$, $R^3$ and $R^4$ independently denote H, $C_1$ to $C_{20}$ alkyl, aryl, heterocyclyl and/or heteroaryl groups, wherein the groups $R^1$ and $R^2$ or respectively $R^3$ and $R^4$ can together form a saturated or unsaturated ring.

Preferred ligands in this connection are chelate ligands containing N atoms.

The preferred ligands include among others triphenylphosphane, 2,2-bipyridine, alkyl-2,2-bipyridine, such as 4,4-di-(5-nonyl)-2,2-bipyridine, 4,4-di-(5-heptyl)-2, 2-bipyridine, tris(2-aminoethyl)amine (TREN), N,N,N',N', N"-pentamethyldiethylenetriamine, 1,1,4,7,10,10-hexamethyltriethylenetetramine and/or tetramethylethylenediamine. Further preferred ligands are described in, for example, International Patent WO 97/47661. The ligands can be used individually or as a mixture.

These ligands can form coordination compounds in situ with copper metal or copper compounds, or they can be synthesized first as coordination compounds and then added to the reaction mixture.

The ratio of ligand to transition metal copper depends on the dentate number of the ligand and on the coordination number of the copper. In general, the molar ratio ranges from 100:1 to 0.1:1, expediently from 10:1 to 0.1:1, preferably from 6:1 to 0.1:1 and especially preferably from 3:1 to 0.5:1, although these values are not to be construed as limitative.

Surprisingly it has been found in connection with the invention that relatively high ligand concentrations lead to extremely good results at the relatively low concentrations of oxidized copper of oxidation numbers (I) and (II), as are usual with the small catalyst quantities preferred according to the invention. Particularly expedient results were found in the use of copper halides as the source for Cu(I) and Cu(II). In this regard a special embodiment of the invention relates to a process in which the weight ratio of CuX to ligand ranges between 1:5 and 1:20, especially expediently between 1:7 and 1:15. In this connection, CuX preferably includes copper halides such as CuCl or CuBr among others.

The monomers, copper catalysts, ligands and initiators are selected as a function of the desired polymer solution. It is assumed that a high rate constant of the reaction between the copper-ligand complex and the transferable group of atoms is essential for a narrow molecular weight distribution. If the rate constant of this reaction is too low, the concentration of radicals becomes too high, and so the typical termination reactions responsible for a broad molecular weight distribution occur. The exchange rate depends on, for example, the transferable group of atoms, the transition metal and the ligands.

The process of the present invention can be performed as bulk polymerization without solvent. Bulk polymerization already leads to very good results. In preferred embodiments of the process, nonpolar solvents are used. Of course, the concentration of copper of oxidation numbers (I) and (II) is not permitted to exceed the values specified hereinabove.

The nonpolar solvents include hydrocarbon solvents, examples being aromatic solvents such as toluene, benzene and xylene, and saturated hydrocarbons such as cyclohexane, heptane, octane, nonane, decane, dodecane, which may also be used in branched form. These solvents can be used individually and also as a mixture. Particularly preferred solvents are mineral oils and synthetic oils as well as mixtures thereof. Of these, mineral oils are particularly preferred.

Mineral oils are known in themselves and are commercially available. They are generally obtained from petroleum or crude oil by distillation and/or refining and if necessary further purification and conversion processes. In this connection the term mineral oil applies in particular to the higher-boiling fractions of crude oil or petroleum. In general, the boiling point of mineral oil is higher than 200° C., preferably higher than 300° C. at 5000 Pa. Synthesis by low-temperature carbonization of shale oil, coking of bituminous coal, distillation of lignite with exclusion of air as well as hydrogenation of bituminous coal or lignite is also possible. A small proportion of mineral oils is also obtained from raw materials originating from plants (such as jojoba, rape) or animals (such as neatsfoot oil). Accordingly, mineral oils contain various proportions of aromatic, cyclic, branched and straight-chain hydrocarbons, depending on origin.

In general, a distinction is made between paraffin-base, naphthenic and aromatic fractions in crude oils or mineral oils. In this connection the term paraffin-base fraction stands for relatively long-chain or highly branched isoalkanes, and naphthenic fraction stands for cycloalkanes. Furthermore, depending on their origin and conversion process, mineral oils contain different proportions of n-alkanes, isoalkanes with low degree of branching, so-called monomethyl-branched paraffins, and compounds with heteroatoms, especially O, N and/or S, with which there are associated polar properties. The proportion of n-alkanes in preferred mineral oils is less than 3 wt %, the proportion of the compounds containing O, N and/or S is less than 6 wt %. The proportion of aromatics and of monomethyl-branched paraffins is generally in the range of 0 to 30 wt % each. According to one interesting aspect, mineral oil comprises mainly naphthenic and paraffin-base alkanes, which in general contain more than 13, preferably more than 18 and especially preferably more than 20 carbon atoms. The proportion of these compounds is generally ≧60 wt %, preferably ≧80 wt %, but these values are not to be construed as limitative.

An analysis of especially preferred mineral oils performed using conventional techniques such as urea separation and liquid chromatography on silica gel reveals, for example, the following constituents. In this connection, the percentage values refer to the total weight of the particular mineral oil being used:

n-alkanes with about 18 to 31 C atoms:
0.7 to 1.0%,
slightly branched alkanes with 18 to 31 C atoms:
1.0 to 8.0%, aromatics with 14 to 32 atoms:
0.4 to 10.7%,
isoalkanes and cycloalkanes with 20 to 32 C atoms:
60.7 to 82.4%,
polar compounds:
0.1 to 0.8%
loss:
6.9 to 19.4%.

Valuable information on analysis of mineral oils as well as a listing of mineral oils having different composition can be found in, for example, Ullmanns Encyclopedia of Industrial Chemistry, 5th Edition on CD-ROM, 1997, key word "lubricants and related products".

Synthetic oils include among other compounds organic esters, organic ethers such as silicone oils, and synthetic hydrocarbons, especially polyolefins. They are usually somewhat more expensive than mineral oils, but have advantages in terms of performance. Further elucidation can be found in the 5 API categories of base-oil types (API: American Petroleum Institute). In this connection these base oils can be used particularly preferably as solvents.

These solvents are used before or during filtration, preferably in a proportion of 1 to 99 wt %, especially preferably 5 to 95 wt % and most preferably 10 to 60 wt % relative to the total weight of the mixture.

The polymerization can be performed at normal, reduced or above-atmospheric pressure. The polymerization temperature also is not critical. In general, however, it ranges from −20° to 200° C., preferably from 0° to 130° C. and especially preferably from 60° to 120° C., although these values are not to be construed as limitative.

By means of the present process, polymers with a predetermined architecture can be obtained in simple manner. These possibilities result from the "living" character of the polymerization process. Such structures include among others block copolymers, gradient copolymers, star polymers, highly branched polymers, polymers with reactive terminal groups and graft copolymers.

It may be of special interest for the inventive process that a copolymer with a non-statistical structure, preferably a two-block, three-block or gradient polymer, can be synthesized in the polymer composition.

The polymers synthesized in the scope of the invention generally have a molecular weight ranging from 1,000 to 1,000,000 g/mol, preferably from $10*10^3$ to $500*10^3$ g/mol, expediently from $10*10^3$ to $300*10^3$ g/mol and especially preferably from $50*10^3$ to $300*10^3$ g/mol, although these values are not to be construed as limitative. These values refer to the weight-average molecular weight of the polydisperse polymers in the composition.

A particularly expedient alternative version of the inventive process is characterized in that polymers with a weight-average molecular weight of $\geq 7,000$ g/mol are synthesized.

The special advantage of ATRP compared with conventional radical polymerization processes is that polymers with a narrow molecular weight distribution can be synthesized. While the following values are not to be construed as limitative, polymers obtained by the inventive process have a polydispersity, expressed by $M_w/M_n$, ranging from 1 to 12, preferably from 1 to 4.5, especially preferably from 1 to 3 and most preferably from 1.05 to 2.

The low concentrations of copper of oxidation numbers (I) and (II), as are typical according to the invention, generally do not cause interference in the intended applications, and so there is no need to perform separation of the catalyst.

For special applications, in which even the low inventive concentrations may cause interference, dissolved copper can be separated by a solid-liquid separation method. Chromatography, centrifugation and filtration are examples of techniques for this purpose.

Preferably the catalyst is removed by filtration, For this purpose the oxidation number of the transition metal is raised following polymerization. Oxidation of the transition metal leads to increased catalyst solubility, to a degree depending on the choice of ligand or ligands, and so the transition metal can be separated by filtration in the presence of a solvent, especially a mineral oil, whose dielectric constant is $\leq 4$, preferably $\leq 3$ and especially preferably $\leq 2.5$.

Oxidation of the transition metal can be achieved with known oxidizing agents such as oxygen, $H_2O_2$ or ozone. Preferably the catalyst will be oxidized with atmospheric oxygen. It is not necessary to bring about complete oxidation of the transition metal or of the transition metal compound. In many cases it is sufficient to bring the composition into contact with atmospheric oxygen for a few minutes in order to ensure sufficient precipitation of the transition metal compound.

Filtration is known in itself and is described in, for example, Ullmann's Encyclopedia of Industrial Chemistry, Fifth Edition, key word "Filtration". Preferably the composition is purified at a pressure difference ranging from 0.1 to 50 bar, preferably 1 to 10 bar and especially preferably 1.5 to 2.5 bar with a filter having a sieve size ranging from 0.01 $\mu$m to 1 mm, preferably 1 $\mu$m to 100 $\mu$m and especially preferably 10 $\mu$m to 100 $\mu$m. These values are to be considered as reference points, since the purification also depends on the viscosity of the solvent and on the particle size of the precipitate.

The filtration is performed in a temperature range similar to that of polymerization, the upper range being dependent on the stability of the polymers. The lower limit is determined by the viscosity of the solution.

The poly(meth)acrylate composition synthesized in this way can be used without further purification as, for example, an additive in lubricating oils. Furthermore, the polymer can be isolated from the composition. For this purpose the polymers can be separated from the composition by precipitation.

The invention will be explained in more detail hereinafter by examples and comparison examples, although the invention is not to be construed as limited to these examples.

I) Particulars of starting materials and methods:
I.1) Educts

The starting portion of DPMA (dodecylpentadecyl methacrylate) to be used was weighed out, allowing for a purity of 98%. CuBr, Cu$_2$O (particle size 5 $\mu$m), copper powder, TsCl (p-toluenesulfonyl chloride), EBiB (ethyl-2-bromoisobutyrate), PMDETA (pentamethyldiethylenetriamine) as well as 2,2,4-trimethylpentane were obtained from Aldrich and, in common with MMA (methyl methacrylate), BMA (n-butyl methacrylate) and DMAPMAm (dimethylaminopropyl methacrylamide) (all Rohm & Haas), were weighed out as starting portions as assuming a purity of 100%. The naphthenic oil used was an oil of the Calumet Co. (viscosity: 37 SUS at 100° F.). The paraffin oil used was a 100N oil manufactured by Petro Canada. Copper foil (Aldrich; thickness: 0.025 mm) was used in pieces of 1 cm$^2$ size. The thickness of the copper sheet used (Alfa Aesar) was 1 mm. The copper braid used (Alfa Aesar) was a 50-mesh gauze comprising copper wires with a thickness of 0.23 mm. The following conversion formula was used to convert the nominal surface area of the particular copper gauze being used into the real copper surface area:

$$\frac{S}{A} = \frac{N\pi D[D/2 + L]}{LW} = 2.86$$

where
- A=nominal surface area in cm$^2$
- D=diameter of copper wire, cm
- L=length, cm
- N number of wires in the nominal surface (corresponding to 2 times mesh size)
- S=real surface area, cm$^2$
- W=width, cm I.2) Determination of residual monomer content in the polymerization batches:

The residual monomer contents for experiments in which MMA (methyl methacrylate) and BMA (n-butyl methacrylate) were used as monomers were determined by gas chromatography in all cases. For this purpose the samples were analyzed directly by head-space GC/MS at a temperature of 130° C. Since poly-DPMA tends to depolymerization under these conditions, 200-µl volumes of poly-DPMA samples in the form of 10% THF solutions were subjected to gel-permeation separation, and the DPMA-containing fractions were determined by means of an accelerated gas chromatography method with flame ionization detection mode. This method was calibrated by means of 0.1% DPMA samples. The head-space GC system was calibrated using 1% MMA and BMA samples. Residual contents of DMAPMAm (dimethylaminopropyl methacrylamide) were obtained by direct GC at a temperature of 150° C. The DMAPMAm/DPMA weight ratios found in the end product corresponded to the relative ratios present in the starting solutions.

I.3) Determination of the copper content in the polymer composition

I.3.1) Copper(I) salts

For soluble copper salts (such as CuCl or CuBr), the copper content in solution was calculated on the basis of the initial weight of copper(I) salt used, under the assumption that the copper(I) salt was present in completely dissolved form during the polymerization reaction. If insoluble or poorly soluble constituents were present, the actual copper concentration in solution is less than the maximum concentration that is theoretically possible on the basis of the initial weight.

I.3.2) For poorly soluble copper sources (elemental copper in the form of powder, gauze, braid, sieve or lamellas), ICP spectroscopy was used to determine the copper content in solution after the end of the polymerization reaction. The following procedure was used for this purpose:

After the end of polymerization of the reaction batch, a sample of about 2 g was weighed into a flask, mixed with 10 ml of sulfuric acid before the beginning of digestion and then digested with added-nitric acid and hydrogen peroxide in an open microwave digester at a maximum temperature of 250° C. The cooled, digested solution was rinsed quantitatively with millipore water into a 50-ml volumetric flask, made up to the mark and used as test solution for determination of the copper content with an ICP spectrometer (atomic emission spectrometer). An ICP instrument of the Jobin Yvon Co., type JY 38 Plus was used. The copper was determined at a wavelength of 324.754 nm. The measurement was performed with program W1. The following calibration standards were used: For each standard, approximately 30 ml of water was placed in a 50-ml volumetric flask and then 7 to 8 ml of sulfuric acid was added carefully; after cooling, the respective quantities of copper standard were added via pipette and the flasks were made up to the mark with water. Standards were prepared in the following concentrations (mg Cu/l): 0; 0.5; 1.0; 2.0 and 4.0. The result obtained by this method was the content of copper that had passed into solution (been oxidized) during the polymerization reaction and that was therefore present in dissolved form at the end of the polymerization reaction. Since copper is not consumed during ATRP, the concentration at the end of the polymerization reaction corresponds to the actual maximum concentration of copper with oxidation numbers (I) and (II).

II. Description of the examples and comparison examples

Comparison Example 1 (VB1)

75 g (0.75 mol) of MMA in 175 g of toluene is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 40.5% and had a polydispersity of 1.21 as well as an M$_n$ value of 15,100.

Comparison Example 2 (VB2)

106.5 g (0.75 mol) of BMA in 143.5 g of toluene is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 39.7% and had a polydispersity of 1.11 as well as an M$_n$ value of 15,500.

EXAMPLE 1 (B1)

209.95 g (0.75 mol) of DPMA in 44.25 g of toluene is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added; after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 91.6% and had a polydispersity of 1.27 as well as an M$_n$ value of 47,700.

Comparison Example 3 (VB3)

75 g (0.75 mol) of MMA in 175 g of toluene is placed in a 500-ml four-necked flask, through which nitrogen is flowing, equipped with sickle-shaped stirrer, reflux condenser and internal thermometer. 104 mg (0.6 mmol) of PMDETA followed by 43 mg (0.3 mmol) of CuBr is added, after which the reaction mixture is heated from room temperature to 95° C. As soon as the solution has reached the desired temperature, 0.58 g (3 mmol) of EBiB is added and the reaction mixture is stirred at 95° C. for 9 hours. The resulting product was obtained in a yield of 22%.

Comparison Example 4 (VB4)

209.95 g (0.75 mol) of DPMA in 143.5 g of toluene is placed in a 500-ml four-necked flask, through which nitrogen is flowing, equipped with sickle-shaped stirrer, reflux condenser and internal thermometer. 104 mg (0.6 mmol) of PMDETA followed by 43 mg (0.3 mmol) of CuBr is added, after which the reaction mixture is heated from room temperature to 95° C. As soon as the solution has reached the desired temperature, 0.58 g (3 mmol) of EBiB is added and the reaction mixture is stirred at 95° C. for 9 hours. The resulting product was obtained in a yield of 43.20%.

EXAMPLE 2 (B2)

209.95 g (0.75 mol) of DPMA in 44.25 g of toluene is placed in a 500-ml four-necked flask, through which nitrogen is flowing, equipped with sickle-shaped stirrer, reflux condenser and internal thermometer. 104 mg (0.6 mmol) of PMDETA followed by 43 mg (0.3 mmol) of CuBr is added, after which the reaction mixture is heated from room temperature to 95° C. As soon as the solution has reached the desired temperature, 0.58 g (3 mmol) of EBiB is added and the reaction mixture is stirred at 95° C. for 9 hours. The resulting product was obtained in a yield of 95.70% and had a polydispersity of 1.27 as well as an $M_n$ value of 54,300. After removal of the reaction product, clearly visible, solid catalyst residues remained on the bottom of the flask.

Comparison Example 5 (VB5)

75 g (0.75 mol) of MMA in 175 g of toluene is placed in a 500-ml four-necked flask, through which nitrogen is flowing, equipped with sickle-shaped stirrer, reflux condenser and internal thermometer. 52 mg (0.3 mmol) of PMDETA followed by 20 mg of copper powder is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 48.7%.

Comparison Example 6 (VB6)

106.5 g (0.75 mol) of BMA in 143.5 g of toluene is placed in a 500-ml four-necked flask, through which nitrogen is flowing, equipped with sickle-shaped stirrer, reflux condenser and internal thermometer. 52 mg (0.3 mmol) of PMDETA followed by 20 mg of copper powder is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 85%.

EXAMPLE 3 (B3)

209.95 g (0.75 mol) of DPMA in 44.25 g of toluene is placed in a 500-ml four-necked flask, through which nitrogen is flowing, equipped with sickle-shaped stirrer, reflux condenser and internal thermometer. 52 mg (0.3 mmol) of PMDETA followed by 20 mg of copper powder is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 97.4%.

Comparison Example 7 (VB7)

75 g (0.75 mol) of MMA in 175 g of toluene is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm² size followed by 52 mg (0.3 mmol) of PMDETA is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 87.00%. The polydispersity measured by means of GPC was 1.30, and the $M_n$ value was 27,800.

Comparison Example 8 (VB8)

106.5 g (0.75 mol) of BMA in 143.5 g of toluene is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm² size followed by 52 mg (0.3 mmol) of PMDETA is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 85%. The polydispersity measured by means of GPC was 1.32, and the $M_n$ value was 33,600.

EXAMPLE 4 (B4)

209.95 g (0.75 mol) of DPMA in 44.25 g of toluene is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm² size followed by 52 mg (0.3 mmol) of PMDETA is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 99.6%. The polydispersity measured by means of GPC was 1.25, and the $M_n$ value was 65,800.

Comparison Example 9 (VB9)

75 g (0.75 mol) of MMA in 175 g of 2,2,4-trimethylpentane is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered $Cu_2O$ is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 34%.

Comparison Example 10 (VB10)

106.5 g (0.75 mol) of BMA in 143.5 g of 2,2,4-trimethylpentane is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 38.9%.

EXAMPLE 5 (B5)

209.95 g (0.75 mol) of DPMA in 44.25 g of 2,2,4-trimethylpentane is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 67.1%

Comparison Example 11 (VB11)

106.5 g (0.75 mol) of BMA in 143.5 g of a naphthenic oil (Calumet) is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 54.2% and had a polydispersity of 1.18 as well as an M$_n$ value of 18,900.

EXAMPLE 6 (B6)

209.95 g (0.75 mol) of DPMA in 44.25 g of a naphthenic base oil (Calumet) is placed in a 500-ml four-necked flask, through which nitrogen is flowing, equipped with sickle-shaped stirrer, reflux condenser and internal thermometer. 52 mg (0.3 mmol) of PMDETA followed by 22 mg (0.15 mmol) of finely powdered Cu$_2$O is added, after which the reaction mixture is heated from room temperature to 95° C. As soon as the solution has reached the desired temperature, 0.57 g (3 mmol) of TsCl is added and the reaction mixture is stirred at 95° C. for 9 hours. The resulting product was obtained in a yield of 98.4% and had a polydispersity of 1.33 as well as an M$_n$ value of 42,600.

Comparison Example 12 (VB12)

75 g (0.75 mol) of MMA in 175 g of toluene is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm$^2$ size followed by 900 mg (4.72 mmol) of PMDETA is added, after which the reaction mixture is heated from room temperature to 95° C. As soon as the solution has reached the desired temperature, 0.18 g (0.94 mmol) of TsCl is added and the reaction mixture is stirred at 95° C. for 15 hours. The resulting product had a polydispersity of 2.26 as well as an M$_n$ value of 69,800.

Comparison Example 13 (VB13)

106.5 g (0.75 mol) of BMA in 143.5 g of toluene is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm$^2$ size followed by 900 mg (4.72 mmol) of PMDETA is added, after which the reaction mixture is heated from room temperature to 95° C. As soon as the solution has reached the desired temperature, 0.18 g (0.94 mmol) of TsCl is added and the reaction mixture is stirred at 95° C. for 15 hours. The resulting product had a polydispersity of 1.78 as well as an M$_n$ value of 112,000.

EXAMPLE 7 (B7)

A mixture of 212.5 g of DPMA, 37.5 g of MMA and 51.6 g of a paraffinic mineral oil (Petro Canada) is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm$^2$ size followed by 900 mg (4.72 mmol) of PMDETA is added, after which the reaction mixture is heated from room temperature to 95° C. As soon as the solution has reached the desired temperature, 0.18 g (0.94 mmol) of TsCl is added and the reaction mixture is stirred at 95° C. for 15 hours. The resulting product had a polydispersity of 1.26 as well as an M$_n$ value of 188,000.

EXAMPLE 8 (B8)

A mixture of 212.5 g of DPMA, 37.5 g of MMA and 51.6 g of a paraffinic mineral oil (Petro Canada) is placed in a 500-ml four-necked flask, through which nitrogen is flowing, equipped with sickle-shaped stirrer, reflux condenser and internal thermometer. 1.5 g of copper foil (Aldrich, thickness: 0.025 mm) in the form of pieces of 1 cm$^2$ size followed by 500 mg (2.88 mmol) of PMDETA is added, after which the reaction mixture is heated from room temperature to 95° C. As soon as the solution has reached the desired temperature, 0.25 g (1.31 mmol) of TsCl is added and the reaction mixture is stirred at 95° C. for 13 hours. The resulting product had a polydispersity of 1.21 as well as an M$_n$ value of 142,000.

EXAMPLE 9 (B9)

A mixture of 6375 g of DPMA and 1142.13 g of MMA is placed in a 20-liter polymerization tank, through which nitrogen is flowing, equipped with a water-cooled internal thread, against which a copper braid (Alfa Aesar; lot number J26j18) weighing 101.21 g was adjusted. Then 20 g (0.115 mol) of PMDETA is added and the reaction mixture is heated from room temperature to 95° C. As soon as the solution has reached the desired temperature, 122.7 g (0.629 mol) of EBiB is added and the reaction mixture is further stirred at 95° C. After 3 hours there is obtained a product in 98.7% yield, which product has a polydispersity index of 1.10 as well as an M$_n$ value of 15,100. After it was emptied, the reaction tank did not contain any visible deposits of solid catalyst residues.

EXAMPLE 10 (B10)

A mixture of 6375 g of DPMA and 1142.13 g of MMA is placed in a 20-liter polymerization tank, through which nitrogen is flowing, equipped with a water-cooled internal thread, against which a copper braid (Alfa Aesar; lot number: J26j18; reused material from Example 9) weighing 49.89 g was adjusted. Then 20 g (0.115 mol) of PMDETA is added and the reaction mixture is heated from room temperature to 95° C. As soon as the solution has reached the desired temperature, 122.7 g (0.629 mol) of EBiB is added and the reaction mixture is further stirred at 95° C. After 4 hours there is obtained a product in 98.8% yield, which product has a polydispersity index of 1.11 as well as an $M_n$ value of 15,700. After it was emptied, the reaction tank did not contain any visible deposits of solid catalyst residues.

EXAMPLE 11 (B11)

A mixture of 6375 g of DPMA, 1142.13 g of MMA and 1500 g of a 100N oil (100N, paraffinic, Petro Canada) is placed in a 20-liter polymerization tank, through which nitrogen is flowing, equipped with a water-cooled internal thread, against which a copper braid (Alfa Aesar; lot number J26j18) weighing 101.21 g was adjusted. Then 20 g (0.115 mol) of PMDETA is added and the reaction mixture is heated from room temperature to 95° C. As soon as the solution has reached the desired temperature, 50 g (0.288 mol) of EBiB is added and the reaction mixture is further stirred at 95° C. After 6 hours there is obtained a product in 93% yield, which product has a polydispersity index of 1.26 as well as an $M_n$ value of 29,400. After it was emptied, the reaction tank did not contain any visible deposits of solid catalyst residues.

EXAMPLE 12 (B12)

A mixture of 6375 g of DPMA, 1142.13 g of MMA and 1500 g of a 100N oil (100N, paraffinic, Petro Canada) is placed in a 20-liter polymerization tank, through which nitrogen is flowing, equipped with a water-cooled internal thread, against which a copper braid (Alfa Aesar; lot number: J26j18; reused material from Example 11) weighing 50.58 g was adjusted. Then 20 g (0.115 mol) of PMDETA is added and the reaction mixture is heated from room temperature to 95° C. As soon as the solution has reached the desired temperature, 50 g (0.288 mol) of EBiB is added and the reaction mixture is further stirred at 95° C. After 6 hours there is obtained a product in 82.6% yield, which product has a polydispersity index of 1.48 as well as an $M_n$ value of 34,100. After it was emptied, the reaction tank did not contain any visible deposits of solid catalyst residues.

EXAMPLE 13 (B13)

A mixture of 6375 g of DPMA, 1142.13 g of MMA and 1500 g of a 100N oil (100N, paraffinic, Petro Canada) is placed in a 20-liter polymerization tank, through which nitrogen is flowing, equipped with a water-cooled internal thread, against which a copper braid (Alfa Aesar; lot number J26j18; reused material from Example 12) weighing 50.58 g was adjusted. Then 20 g (0.115 mol) of PMDETA is added and the reaction mixture is heated from room temperature to 95° C. As soon as the solution has reached the desired temperature, 8.13 g (0.042 mol) of EBiB is added and the reaction mixture is further stirred at 95° C. After 21 hours there is obtained a product in 92.7% yield, which product has a polydispersity index of 1.27 as well as an $M_n$ value of 143,000. After it was emptied, the reaction tank did not contain any visible deposits of solid catalyst residues.

EXAMPLE 14 (B14)

A mixture of 6375 g of DPMA, 1142.13 g of MMA and 1500 g of a 100N oil (100N, paraffinic, Petro Canada) is placed in a 20-liter polymerization tank, through which nitrogen is flowing, equipped with a water-cooled internal thread, against which a copper braid (Alfa Aesar; lot number J26j18; reused material from Example 13) weighing 50.58 g was adjusted. Then 20 g (0.115 mol) of PMDETA is added and the reaction mixture is heated from room temperature to 95° C. As soon as the solution has reached the desired temperature, 5.85 g (0.030 mol) of EBiB is added and the reaction mixture is further stirred at 95° C. After 23 hours there is obtained a product in 98.8% yield, which product has a polydispersity index of 1.37 as well as an $M_n$ value of 199,000. After it was emptied, the reaction tank did not contain any visible deposits of solid catalyst residues.

EXAMPLE 15 (B15)

The ATRP experiments according to Example 15 were performed in a four-necked round-bottomed flask equipped with sickle-shaped stirrer, heating mantle, nitrogen delivery tube and high-efficiency condenser. For this purpose the monomer mixture, which comprised 212.5 g (0.775 mol) of dodecyl methacrylate (DPMA, obtained by reaction of ®Dobanol 25 L (of Shell AG) with methyl methacrylate, followed by separation of liberated methanol), 10.12 g (0.060 mol) of N,N-dimethylaminopropyl methacrylate (DMAPMAm) and 37.5 g of methyl methacrylate was placed in the reaction flask along with 51.6 g of mineral oil (paraffin-base 100N oil of the Petro Canada Co.) and inerted by addition of dry ice and delivery of nitrogen. Then 2 g of copper foil (Aldrich, thickness 0.025 mm, divided into pieces of approximately 1 cm² size) and 900 mg (5.2 mmol) of pentamethyldiethylenetriamine (PMDETA) were added.

After heating to 95° C., 0.97 g (5 mmol) of para-toluenesulfonyl chloride (TSCl) was added. After a reaction time of about 9 hours at a temperature of 95° C., the mixture was cooled to room temperature. Then the mixture was analyzed by means of GPC.

The resulting yield was 87%. The obtained polymer had a polydispersity of 1.48 as well as a number-average molecular weight of 37,200.

Comparison Example 14 (VB14)

Example 15 was substantially repeated. As catalyst, however, 250 mg (1.7 mmol) of CuBr was used instead of metallic copper.

The resulting yield was 53%. The obtained polymer had a polydispersity of 2.59 as well as a number-average molecular weight of 39,800.

EXAMPLE 16 (B16)

Example 15 was substantially repeated. As catalyst, however, 0.98 g (5 mmol) of ethyl 2-bromoisobutyrate (EBiB) was used instead of pTSCl as initiator.

The resulting yield was 87%. The obtained polymer had a polydispersity of 1.65 as well as a number-average molecular weight of 38,900.

Comparison Example 15 (VB15)

Example 16 was substantially repeated. As catalyst, however, 250 mg (1.7 mmol) of CuBr was used instead of metallic copper.

The resulting yield was 42%. The obtained polymer had a polydispersity of 2.91 as well as a number-average molecular weight of 22,000.

III. Results

III.1) Influence of length of the alkyl chain of the monomer

In contrast to "short-chain methacrylates" such as MMA or BMA, (meth)acrylates substituted with long-chain alkyl groups (carbon chain in the ester group larger than or equal to C10, referred to hereinafter as AMA's) can be polymerized to higher conversions and products with narrower distribution under otherwise analogous process conditions. This was successfully demonstrated on the basis of the residual monomer concentrations (see Tables 1 to 3) following homopolymerization with MMA, BMA and DPMA (dodecylpentadecyl methacrylate) respectively in solution (in toluene or in a saturated hydrocarbon such as 2,2,4-trimethylpentane or, in the case of BMA and DPMA, in mineral oil also).

TABLE 1

Conversions from homopolymerization of MMA, BMA and DPMA respectively in toluene

| Cat. source | MMA | | BMA | | DPMA | | |
|---|---|---|---|---|---|---|---|
| | Resid. mon. [%] | Conv. [%] | Resid. mon. [%] | Conv. [%] | Resid. mon. [%] | Conv. [%] | No. |
| Cu(I)$_2$O | 59.5 | 40.5 | | | | | VB1 |
| Cu(I)Br | 78 | 22 | | | | | VB3 |
| Cu powd. | 51.3 | 48.7 | | | | | VB5 |
| Cu foil | 13 | 87 | | | | | VB7 |
| Cu(I)$_2$O | | | 60.3 | 39.7 | | | VB2 |
| Cu(I)Br | | | 56.8 | 43.2 | | | VB4 |
| Cu powd. | | | 16 | 84 | | | VB6 |
| Cu foil | | | 15 | 85 | | | VB8 |
| Cu(I)$_2$O | | | | | 8.4 | 91.6 | B1 |
| Cu(I)Br | | | | | 4.3 | 95.7 | B2 |
| Cu powd. | | | | | 2.6 | 97.4 | B3 |
| Cu foil | | | | | 0.4 | 99.6 | B4 |

Homopolymerization 3 molar relative to monomer concentration in toluene (T=95° C.);
Initiator: TsCl (0.23 wt % relative to total weight), except in CuBr-catalyzed reactions (in which case EBiB, also 0.23 wt %);
Ligand: PMDETA ([cat.]:[lig.]=1:2)
Cu$_2$O conc.: [cat.]:[init.]=0.05:1 (corresponds to 70 ppm Cu);
CuBr cat. conc.: [cat.]:[init.]=0.1:1;
Batches run for 9 hours;
Cu powder: 80 ppm; ligand concentration: [lig.]:[init.]=0.1:1
Cu foil: 0.6 wt % (in pieces of 1 cm$^2$ size, thickness: 0.025 mm, Cu in solution <100 ppm);
Ligand concentration: [lig.]:[init.]=0.1:1;
Residual monomer as well as conversion in wt % of the total monomer content $M_n$ theoretical: PMMA (25,000), PBMA (35,500), PDPMA (68,500)

$M_w/M_n$: all polydispersity values ranged between 1.1 and 1.35

TABLE 2

Conversions from homopolymerization of MMA, BMA and DPMA respectively in trimethylpentane (reaction conditions analogous to those presented in Table 1)

| Experiment | VB9 | VB10 | B5 |
|---|---|---|---|
| Catalyst | Cu$_2$O(1) | Cu$_2$O(1) | Cu$_2$O(1) |
| Monomer | MMA | BMA | DPMA |
| Conversion | 34 | 38.9 | 67.1 |

TABLE 3

Conversions from homopolymerization of BMA and DPMA respectively in a naphthenic base oil (reaction conditions analogous to those presented in Table 1)

| Experiment | VB11 | B6 |
|---|---|---|
| Catalyst | Cu$_2$O(1) | Cu$_2$O(1) |
| Monomer | BMA | DPMA |
| Conversion | 54.2 | 98.4 |

Table 4 hereinafter summarizes results of the ATRP synthesis of polymers with relatively high molecular weight. In this case AMA's or AMA-containing monomer mixtures were polymerized using a metallic copper source. Under these conditions the concentration of copper determined in the composition at the end of polymerization had the relatively low value of less than 70 ppm.

TABLE 4

Synthesis of polymers with relatively high molecular weights by means of ATRP (catalyst: Cu(O))

| No. | Monomers | [lig]:[init] | Mn th. | Mn exp. | DP th. | DP exp. | Mw/Mn |
|---|---|---|---|---|---|---|---|
| B7 | DPMA:MMA = 0.85:0.15 | 5 | 250,000 | 188,000 | 1008 | 758 | 1.26 |
| B8 | DPMA:MMA = 0.85:0.15 | 1.82 | 180,0000 | 142,000 | 726 | 573 | 1.21 |
| VB12 | MMA | 5 | 100,000 | 69,800 | 1,000 | 698 | 2.26 |
| VB13 | BMA | 5 | 142,000 | 11,200 | 1,000 | 788 | 1.78 |

Initiator: tosyl chloride, ligand: PMDETA, temperature: 95° C.,
Reaction times: 15 hours;
DP=degree of polymerization; $DP_{exp}$ is calculated from $M_n$exp/average molecular weight of the monomer; $DP_{th}$ is calculated from $M_n$th/average molecular weight of the monomer Starting concentration: 3 mol monomer in mineral oil (DPMA/MMA);

3 mol monomer in toluene for MMA and BMA batches;

0.66 wt % copper foil relative to total weight (in pieces of 1 cm$^2$ size, thickness: 0.025 mm, copper concentration of the solution <70 ppm);

Polymerization with a target degree of polymerization of 1000 starting from MMA or BMA led to greater polydispersity. ATRP processes with a DPMA/MMA mixture (weight ratio 0.85:0.15) yielded products with a narrow distribution of Mw/Mn values (see Table 4) even with higher target degrees of polymerization (DP=1008 for a target Mn of 250,000, or DP=725 for a target Mn of 180,000).

As was also mentioned in the introduction, the analogous trend of the results summarized in Tables 1 to 3 as well as 4 was also found when ethyl 2-isobutyrate (EBiB) was used as initiator instead of p-toluenesulfonyl chloride (TsCl) (see Table 5). The use of a copper gauze as catalyst (stainless-steel tank, volume 20 liters, volume of reaction solution approximately 10 liters) led to narrow molecular weight distributions (Examples B13 and B14 in Table 5) even in the case of high target molecular weights, and was associated with reaction times comparable to those observed for TsCl-initiated syntheses. The concentration of the copper dissolved in the reaction mixture was between 20 and 80 ppm for all batches shown in Table 5.

Particularly for the experiments summarized in Table 5, it can be stated that AMA-containing ATRP batches can be processed without visible deposit of catalyst residues in the reaction vessel.

The use of Cu(0) materials as catalysts or catalyst sources in AMA-containing ATRP processes makes it possible to present a large surface area to the reaction mixture, while at the same time the catalyst source is present in a stationary phase and therefore can be easily reused. A speculative explanation is that active catalyst species are dissolved out of the solid metal assemblage and distributed homogeneously in the reaction mixture. Such a concept suggests that just enough metal-containing species are supplied to the reaction mixture as are actually necessary for an ATRP process. Elemental copper represents an inexpensive source for such a process, as can be confirmed in experiments using a copper foil or a braid permanently installed in the synthesis tank (see Tables 1, 4, 5). Since elemental copper is completely insoluble in the monomer mixtures described here, it can be assumed that the passage of copper species into dissolved form is due to the activation reaction between initiator and Cu(0). Despite relatively low catalyst concentrations (<200 ppm, preferably <100 ppm, especially expediently 20 to 80 ppm Cu) in the liquid phase, products with narrow distribution are obtained in high degrees of conversion and within convenient reaction times with AMA-containing monomer mixtures.

The Cu(0) catalysts used were successfully reused in subsequent ATRP experiments. As regards the catalyst activity, no difference was found by comparison with the use of new copper materials. Thus the catalyst can be conveniently reused in large-scale industrial processes also.

Surprisingly it was further found that dispersing monomers such as dimethylaminopropyl methacrylamide (DMAPMAm) or monomer mixtures containing such dis-

| | | Cu gauze | | | | Mn | | | |
|---|---|---|---|---|---|---|---|---|---|
| Mon. conc. | Cu(I) + Cu(II) | Real | | | | | | | |
| (%) Example | conc. ppm | surf. area (cm$^2$) | EBiB (g) | PMDETA (g) | Theory (g/mol) | Exp. (g/mol) | PDI | Conv. % (h) | |
| 100 B9 | | 1991 | 122.7 | 20 | 12,000 | 15,100 | 1.10 | 98.7 (3) 97.4 (2) | |
| 100 B10 | 89 | 991 | 122.7 | 20 | 12,000 | 15,700 | 1.11 | 98.8 (4) 98.2 (2) | |
| 83.4 B11 | 21 | 1991 | 50.0 | 20 | 29,250 | 29,400 | 1.26 | 96.0 (6) | |
| 83.4 B12 | | 991 | 50.0 | 20 | 29,250 | 34,100 | 1.48 | 82.6 (6) | |
| 83.4 B13 | 18 | 991 | 8.13 | 20 | 180,000 | 143,000 | 1.27 | 92.7 (21) 89.9 (13) | |
| 80.0 B14 | 30 | 991 | 5.85 | 20 | 250,000 | 199,000 | 1.37 | 98.8 (23) | |

From the results shown it is evident among other facts that the use of Cu$_2$O instead of CuBr requires even less catalyst material under otherwise identical reaction conditions. In ATRP experiments with Cu$_2$O, it was also found that undissolved Cu$_2$O, by virtue of its finely powdered consistency at the beginning of the reaction, could be homogeneously distributed much more easily in the reaction mixture and had a smaller tendency than CuBr to become deposited in zones of the reaction vessel where intermixing is poorer.

It was also observed that, when a metallic copper source ((such as copper foil or copper braid as catalyst material) (bulk polymerization or solution polymerization with mineral oil or toluene as solvent)) was used, it was possible completely to avoid deposits of either unreacted catalyst or of precipitated metal compounds in all cases.

persing monomers can be polymerized excellently by using metallic copper sources or oxidic copper(I) salts (Examples 15 and 16 as well as Comparison Examples 14 and 15). Especially for the use of copper(I) oxide, it was clearly shown that reactions in the presence of Cu$_2$O were characterized by complete conversions.

What is claimed is:

1. A process for the synthesis of polymer compositions, which comprises:

polymerizing an ethylenically unsaturated monomer material comprising from 50 to 100 wt %, relative to the total weight of the monomer material, of at least one ethylenically unsaturated ester of formula (I):

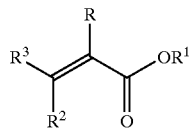
(I)

wherein R is hydrogen or methyl, $R^1$ is a straight chain or branched alkyl group of 8 to 40, carbon atoms, $R^2$ and $R^3$ independently are each hydrogen or —COOR', wherein R' is hydrogen or a straight chain or branched alkyl group of 8 to 40 carbon atoms, in the presence of an initiator containing a transferable group of atoms and at least one catalyst comprising at least one transition metal in the presence of ligands which form a coordination compound with the at least one metal catalyst, wherein the at least one metal catalyst is a copper catalyst employed in an amount such that the total concentration of copper of oxidation numbers (I) and (II) in the polymerization composition is ≦200 ppm, relative to the total weight of the composition, which excludes the weight of copper of oxidation number (0) in the composition.

2. The process according to claim 1, wherein the carbon atom content of each of the hydrocarbyl groups of $R^1$ and R' ranges from 10 to 40.

3. The process according to claim 1, wherein the total concentration of copper of oxidation numbers (I) and (II) in the composition is ≦150 ppm.

4. The process according to claim 1, wherein the total concentration of copper of oxidation numbers (I) and (II) in the composition is ≦100 ppm.

5. The process according to claim 1, wherein metallic copper is the source of copper of oxidation numbers (I) and (II) in the polymerization composition.

6. The process according to claim 5, wherein copper sheet, copper wire, copper foil, copper shavings, copper gauze, copper braid, copper textile or copper powder is the source of copper.

7. The process according to claim 1, wherein a copper salt is the source of copper of oxidation numbers (I) and (II) in the polymerization composition.

8. The process according to claim 7, wherein a copper halide is said copper salt.

9. The process according to claim 8, wherein said copper halide is copper(I) chloride.

10. The process according to claim 6, wherein the polymer prepared by polymerization has a weight average molecular weight of ≧7,000 g/mol.

11. The process according to claim 1, wherein the polymer prepared has a polydispersity of ≦2.0.

12. The process according to claim 1, wherein the ethylenically unsaturated monomer material comprises at least 50 wt % of at least one (meth)acrylate of formula (II):

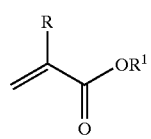
(II)

wherein R is methyl and $R^1$ is a straight chain or branched alkyl group of 8 to 40 carbon atoms.

13. The process according to claim 12, wherein hydrocarbyl group $R^1$ has 10 to 40 carbon atoms.

14. The process according to claim 1, wherein the ethylenically unsaturated monomer material comprises:

a) 60 to 100 wt % of at least one ethylenically unsaturated ester compound of formula (I):

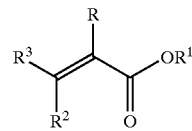
(I)

wherein R is hydrogen or methyl, $R^1$ is a straight chain or branched alkyl group of 8 to 40, carbon atoms, $R^2$ and $R^3$ independently are each hydrogen or —COOR', wherein R' is hydrogen or a straight chain or branched alkyl group of 8 to 40 carbon atoms;

b) 0 to 40 wt % of at least one (meth)acrylate of formula (III):

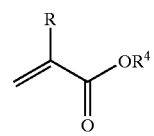
(III)

wherein R is methyl and $R^4$ is a straight chain or branched alkyl group of 1 to 7 carbon atoms;

c) 0 to 40 wt % of at least one (meth)acrylate of formula (IV):

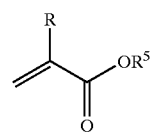
(IV)

wherein R is methyl and $R^5$ is an alkyl group, substituted by an OH group, of 2 to 20 carbon atoms, or an ethoxylated group of formula (V):

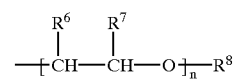
(V)

wherein $R^6$ and $R^7$ independently are each hydrogen or methyl, $R^8$ is hydrogen or an alkyl group of 1 to 40 carbon is an integer of 1 to 60;

d) 0 to 40 wt % of at least one (meth)acrylate of formula (VI):

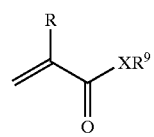
(VI)

wherein R is methyl, X is oxygen or an amino group of the formula —NH— or —$NR^{10}$—, wherein $R^{10}$ is an alkyl group of 1 to 40 carbon atoms, and $R^9$ is a straight chain or branched alkyl group, substituted by at least one —NR$^{11}$R$^{12}$ group, of 2 to 20 carbon atoms, wherein R$^{11}$ and R$^{12}$ are each independently hydrogen, an alkyl group of 1 to 20 carbon atoms or wherein R$^{11}$ and R$^{12}$, including the nitrogen atom, form a 5-membered or 6-membered ring, which optionally is substituted by C$_1$ to C$_6$ alkyl; and e) 0 to 40 wt % of at least one comonomer, wherein the wt % amount of each of a) to d) is based on the total weight of the ethylenically unsaturated unsaturated monomer material.

15. The process according to claim 1, wherein the comonomers of the ethylenically unsaturated unsaturated monomer material comprises styrene, (meth)acrylate derivatives and/or dispersing monomers.

16. The process according to claim 1, wherein at least on eligand is a chelating ligand containing one or more nitrogen atoms.

17. The process according to claim 1, wherein the initiator contains Cl, Br, I SCN, and/or N$_3$.

18. The process according to claim 1, wherein the polymerization reaction is conducted in solution.

19. The process according to claim 1, wherein the polymerization is carried out in a solution comprising a solvent selected from the group consisting of at least one of a mineral oil and a synthetic oil.

20. The process according to claim 19, wherein the amount of solvent ranges from 5 to 95 wt %, based on the total weight of the liquid composition.

21. The process according to claim 20, wherein the amount of solvent ranges from 10 to 60 wt %.

22. The process according to claim 20, wherein the copolymer produced has a non-statistical structure.

23. The process according to claim 22, wherein the non-statistical structure is a two-block, three-block or gradient polymer.

24. The process according to claim 18, which further comprises isolating the polymer product from the solution.

\* \* \* \* \*

UNITED STATES PATENT AND TRADEMARK OFFICE
CERTIFICATE OF CORRECTION

PATENT NO.     : 6,610,801 B1
DATED          : August 26, 2003
INVENTOR(S)    : Scherer It is certified that error appears in the above-identified patent and that said Letters Patent is hereby corrected as shown below:

Title page, Item [54] and Column 1, lines 1-2,
The Title should read:
-- [54]  PROCESSES FOR SYNTHESIS OF POLYMER COMPOSITIONS AS WELL AS USE OF SAME --

Signed and Sealed this

Twentieth Day of January, 2004

JON W. DUDAS
*Acting Director of the United States Patent and Trademark Office*